Nov. 25, 1930.   F. S. BOLTZ   1,783,033

SOIL WATER CATCH BASIN AND HEAT RECLAIMER

Filed Feb. 23, 1928

Inventor:
Fred S. Boltz
By Macleod, Calver, Copeland & Dike
Attorneys.

Patented Nov. 25, 1930

1,783,033

UNITED STATES PATENT OFFICE

FRED S. BOLTZ, OF MANSFIELD, MASSACHUSETTS

SOIL-WATER CATCH BASIN AND HEAT RECLAIMER

Application filed February 23, 1928. Serial No. 256,126.

The invention relates to apparatus for utilizing the heat of water which has already been heated and used and which is usually allowed to run to waste, such as water which has performed its function in a laundry, dyehouse, wool scouring plant or elsewhere. The present invention is an improvement on an application filed by me February 17, 1926, and since then issued as Patent No. 1,689,993. Apparatus embodying the invention comprises a catch basin for the hot soil water and a heat transfer element which in its preferred form consists of a shell having tube sheets at its opposite ends and tubes extending through the shell and connected with said sheets, said tubes being open at their ends to the soil water in the catch basin in combination with means for introducing fresh cold water into the shell so that the clean water comes in contact with the hot soil water tubes and is heated thereby and then is delivered to some point outside where the fresh clean water thus heated is to be used.

The waste water in the catch basin will, after a time, form a surface scum. The heating surface at the top of the shell or heat extractor and the inner walls of the tubes gradually collect a surface film of grease and dirt which retards heat transfer. It is important to remove this surface scum and film from time to time in order to obtain the best results from the heat transfer element. As the normal level of the waste water is above the top of the heat transfer element which during the normal operation is wholly immersed in the soil water, it is important to drain the soil water from the catch basin sufficiently to expose the top of the heat extractor so that the upper tube sheet can be cleaned and also to permit a tube cleaner to be inserted into and through the tubes for cleaning the inner walls of the tubes. One feature of the present invention consists of a scum draw-off and drain to enable the cleaning of the heat extractor.

The invention will be fully understood from the following description when taken in connection with the accompanying drawings, and the novel features thereof will be pointed out and clearly defined in the claims at the close of this specification.

Figure 1:
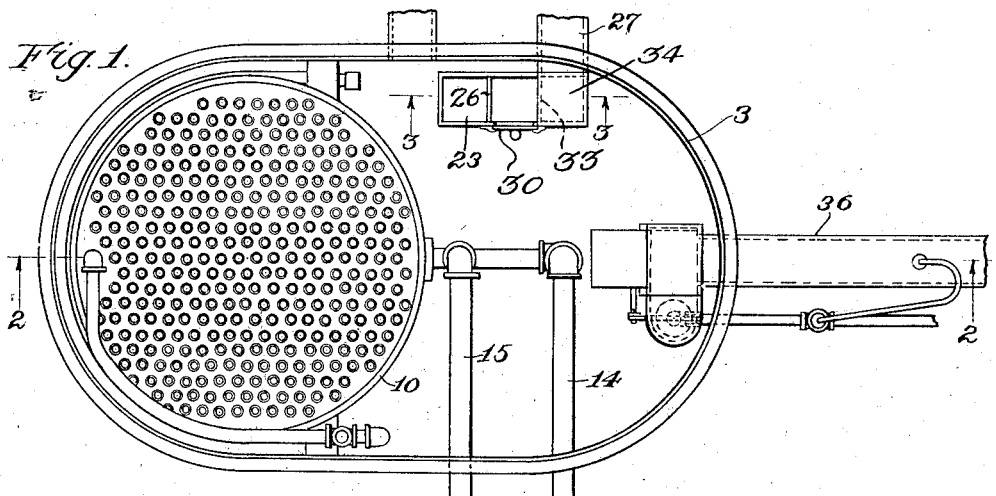
Fig. 1 is a plan view of one form of apparatus embodying the invention.
Figures 2, 3:
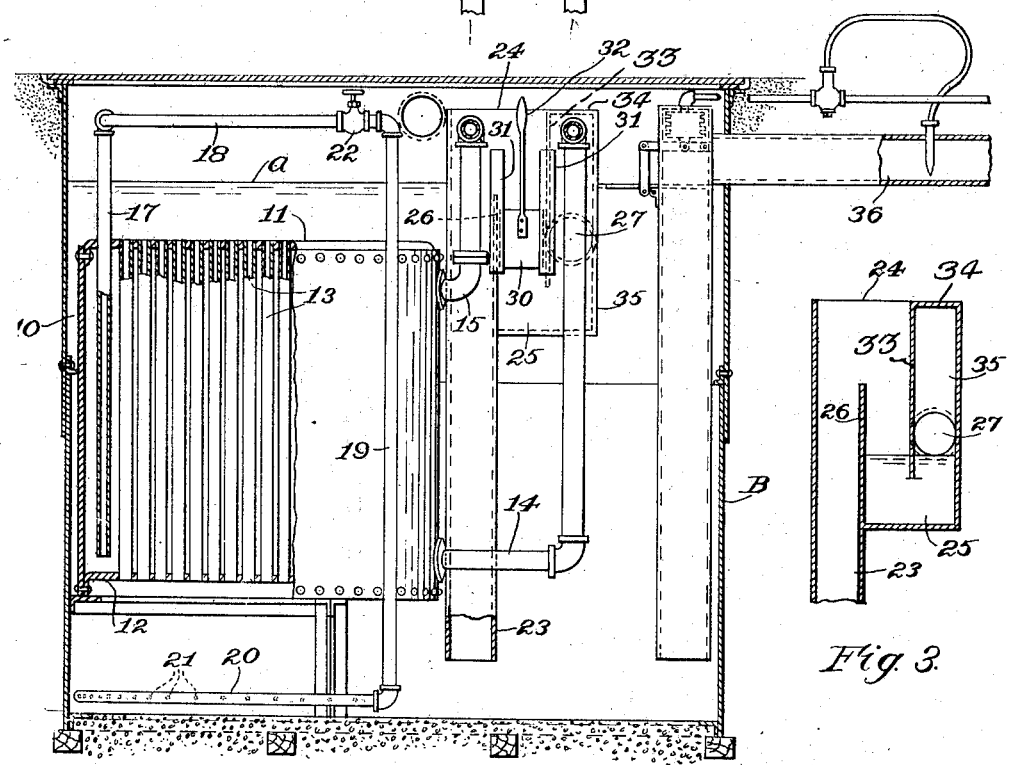
Fig. 2 is a vertical section on line 2—2, Fig. 1.
Fig. 3 is a section on line 3—3, Fig. 1.

Referring to the drawings, there is shown a heating apparatus consisting of a hollow cylindrical shell 10 having tube sheets 11 and 12 at its upper and lower ends respectively and tubes 13 extending through the shell and connected with the tube sheets, the said tubes being open at each end to the interior of the catch basin B in which it is set.

The hot soil water from the catch basin will enter the tubes 13 at their upper ends, it being assumed that the hot soil water in the basin will be of sufficient depth so that the upper surface of the soil water will normally be above the tops of the tubes.

An inlet pipe 14 for the fresh water which is to be heated enters the shell 10 through an inlet aperture in the wall of the shell near the lower end thereof just above the lower tube sheet 12 and delivers clean water into said shell. The clean cold water thus introduced will circulate around the tubes within the shell and pass upward to the fresh water outlet 15 through the side wall of the shell just below the upper tube sheet 11. The fresh water will be heated by contact with the hot tubes which are heated by the hot soil water. The hot soil water enters the basin through pipe 36.

A soil water overflow pipe 23 is provided through which the cooled soil water settling to the bottom of the catch basin will be carried from the lower part of the basin upward to the upper part of the catch basin at a point higher than the top of the shell and thence will be discharged to the sewer or other suitable place of delivery. This overflow pipe 23 is open at its lower end to the soil water in the lower part of the catch basin and extends upward within the catch basin but outside of the shell 10 to a point somewhat above the normal level of the hot soil water in the basin and is open at its upper end. The normal level of the soil water is shown at *a* and the upper end of the overflow pipe is shown at 24.

Projecting from one side of the overflow pipe near the upper end thereof is a chamber 25 which forms an enlargement of the upper portion of the pipe 23, said chamber having a closed bottom. A vertical partition or baffle 26 separates said chamber from the main body of the pipe 23 and extends up to about the normal level of the waste water but not to the full height of said pipe 23. This baffle plate forms a dam over which the waste water as it rises in the overflow pipe can flow into said chamber 25. The chamber 25 has an upward extension 35 having an outlet pipe 27.

After the warm waste water in the upper part of the heat extractor and catch basin has given off its heat, it sinks or settles to the bottom of the catch basin while the incoming hot waste water remains at the top. The pressure of the incoming hot waste water at the top will force the cooled waste water at the bottom up through the overflow pipe and thence out through the discharge passage to the sewer.

As it is desirable to maintain a head of water over the heat extractor or transfer element, the overflow pipe extends upward to a point higher than the top of the heat extractor. In the apparatus shown in the drawings, as already described, the cold waste water flows over the baffle 26 near the upper end of the overflow pipe and drops down into the chamber 25 whence it passes down through the outlet 27.

One feature of the present invention consists of a scum draw-off and drain to enable the cleaning of the heat extractor.

In order to provide means for lowering the level of the water in the catch basin sufficiently for the purpose of drawing off the scum and cleaning the heat extractor, I have provided a valve in the side of the chamber 25 at some distance below the top of the overflow pipe so that when the said valve is open, the water in the upper part of the catch basin can flow directly into the side chamber 25 and thence to the outlet 27 without first going over the top of the baffle. The form of the valve shown in the drawings is a slide valve 30 which slides in ways 31 in the side of the chamber 25. This valve may be operated by a handle 32 which extends above the normal level of the waste water in the catch basin so that it may be easily reached and operated by hand when the cover of the catch basin is removed. Any other suitable valve, however, may be employed.

The opening in the side of the chamber 25 which is controlled by said valve extends below the top of the heat reclaimer, that is, below the upper tube sheet 11 in the apparatus shown in the drawings so that the level of the waste water may be lowered sufficiently to expose the top of the heat reclaimer and the entrance to the tubes. The most of the scum on the surface of the waste water will run off into the overflow pipe, when the level of the waste water falls to the level of the valve opening. During the time that the valve is open and the level of the soil water is below the top of the heat reclaimer the top of the shell can be cleaned and suitable tube cleaning devices can be inserted into the tubes to clean the inner walls of the tubes.

After the scum has been drawn off and the tubes have been cleaned the slide valve 30 should be closed again.

It is desirable to seal the entire catch basin so that odors or fumes can not escape from the catch basin into the building in which it is located and I have provided means for that purpose. This means consists of a water seal trap in the waste water overflow pipe. To provide for this trap the portion 35 of the chamber 25 from which the outlet pipe 27 leads is made air tight by a cap 34 and a vertical partition 33 which extends down below the outlet 27. This branch portion 35 of the chamber may be formed as an upward bend in the overflow pipe. This trap will prevent foul air in the catch basin from escaping into the building by way of the sewerage connection.

A blow-off pipe 17, whose lower end is open to the interior of the shell 10 near the bottom of the tube sheet 12, extends up through the upper tube sheet to a point above the normal level of the waste water and is connected with a pipe 18 which extends in a horizontal plane above the shell, and is then connected with a pipe 19 which extends down outside of the shell, but within the basin to a point below the lower end of the shell. It is there connected with a pipe 20 having a plurality of apertures 21. A blow-off valve 22 is connected with the pipe 18, and is normally kept closed. By opening the said valve 22 the pressure of the incoming cold water through the inlet pipe 14 will cause a current through the shell 10 to the open lower end of the pipe 17, thence up through the pipe 17 and the various extensions thereof, thence through the apertures 21 toward the open lower end of the overflow pipe 23. This will set up a current in the lower part of the catch basin toward the open lower end of the overflow pipe, and cause an upward flow through the pipe 23 to the chamber 25, thence to the outlet 27.

I claim:

1. An apparatus of the character described comprising a soil water catch basin, a shell mounted in said basin, said shell having tube sheets at its top and bottom and a plurality of tubes connecting said sheets, said tubes being open at their ends to soil water in the basin, means for introducing clean water into said shell and into contact with said tubes, means for discharging the clean water from said shell to a point outside of said basin, an overflow discharge pipe extending from the lower part of said basin to a point higher than the top of the said shell, a discharge outlet from the overflow pipe and a water seal trap between the overflow pipe and the discharge outlet.

2. An apparatus of the character described comprising a soil water catch basin, a shell mounted in said basin having tube sheets at its top and bottom and a plurality of tubes connecting said sheets, said tubes being open at their ends to soil water in the basin, means for introducing clean water under pressure into said shell and into contact with said tubes, means for discharging the clean water from said shell to a point outside of said basin, an overflow discharge pipe extending from the lower part of said basin to a part of the basin higher than the top of the said shell, a siphon blow-off pipe, one leg of which is open at its lower end to the lower part of the interior of the clean water shell and which extends out of said shell to a point above the clean water shell and is there connected with another leg of the siphon which extends down into the lower part of the waste water basin, said other leg having at its lower end a portion open to the interior of the catch basin, and a valve which controls the passage through said siphon, the pressure of said clean water introduced into the shell and thence through said siphon into the catch basin when said valve is open being adapted to force the soil water and entrained contents up through said overflow pipe, and a discharge outlet from the overflow pipe.

3. Apparatus of the character described comprising a soil water catch basin, a soil water heat reclaimer shell mounted therein, said shell having tube sheets at the top and bottom and tubes open at the ends to soil water in the basin, means for introducing clean water into said shell, a discharge passage for the clean water from the shell to a point outside of the basin, an overflow discharge pipe extending from the lower part to the upper part of the basin, said pipe having an inlet opening into the lower part of the basin and having an outlet at some distance above the top of said shell, a chamber into which said overflow pipe normally discharges, said chamber also having an inlet thereto directly from the catch basin sufficiently below the outlet from the overflow pipe to permit lowering the level of the soil water to expose the top of said heat reclaimer, a valve for closing at will said inlet from the basin to said chamber and a discharge outlet from said chamber.

4. Apparatus of the character described comprising a soil water catch basin, a heat reclaimer shell within said basin having passages therethrough open to the soil water in the basin, means for causing a flow of clean water into and out of said shell without mingling with the soil water, a soil water overflow pipe extending from the lower part of the basin to a point at some distance above the top of the heat reclaimer, said pipe having an inlet thereto in the lower part of the basin, an outlet from said discharge pipe above the heat reclaimer, an outlet from the said catch basin below the top of the heat reclaimer, and a valve to said lower outlet controllable at will whereby when said valve is opened the soil water will be discharged through said lower outlet and the level of the soil water in the basin may be lowered to the top of the heat reclaimer shell and when said valve is closed the soil water will have its discharge through the overflow pipe.

5. Apparatus of the character described comprising a soil water catch basin, a shell mounted in said catch basin, having tube sheets at its ends and a plurality of tubes connecting said sheets, the tubes being open at their ends to soil water in the basin, means for introducing clean water into said shell and into contact with said tubes, means for discharging the clean water from said shell to a point outside said catch basin, an overflow discharge pipe for the soil water leading from the lower part of the catch basin to a point above the top of said shell, a chamber into which the overflow pipe discharges, said chamber having an inlet thereto from the catch basin below the top of the said shell, said chamber also having an outlet and a valve which controls said inlet to the chamber whereby when said valve is open the soil water in the upper part of the basin is discharged into said chamber and the soil water in the basin may thereby be lowered sufficiently to expose the top of said shell.

6. Apparatus of the character described comprising a soil water catch basin, a heat reclaimer shell mounted in said catch basin having tube sheets at its ends and a plurality of tubes connecting said sheets, the tubes being open at their ends to soil water in the basin, means for introducing clean water under pressure into said shell and into contact with said tubes, means for then discharging the clean water under pressure from said shell to a point outside said catch basin, an overflow discharge pipe for the soil water extending from the lower part of the catch basin to a point higher than the top of said shell, a siphon blow-off pipe, one leg of which is open at its lower end to the lower part of the interior of the clean water shell and which extends out of said shell to a point above the clean water shell and is there connected with another leg of the siphon which extends down into the lower part of the waste water basin, said other leg having at its lower end a portion open to the interior of the catch basin, and a valve which controls the passage through said siphon, the pressure of said clean water introduced into the shell and thence though said siphon into the catch basin when said valve is open being adapted to normally force the soil water and entrained contents up through said overflow pipe, a chamber into which the overflow pipe discharges, said chamber having an inlet thereto from the catch basin below the top of the said shell, and a valve which controls said inlet to the chamber whereby when said valve is open the soil water in the upper part of the basin is discharged directly into said chamber and the soil water in the basin may thereby be lowered sufficiently to expose the top of said shell.

7. An apparatus of the character described comprising a catch basin for hot soil water and a receptacle for clean water so arranged with relation to each other that the hot soil water transfers heat to the clean water, means whereby the soil water and the clean water are prevented from intermingling, an overflow discharge pipe extending upward from the lower part of the soil water receptacle and having a discharge outlet at a point higher than the level of the water in the clean water receptacle, and a water seal trap between the overflow pipe and the discharge outlet.

8. An apparatus of the character described comprising a catch basin for hot soil water and a receptacle for clean water so arranged with relation to each other that the hot soil water transfers heat to the clean water through the wall of one of said receptacles, means whereby the soil water and the clean water are prevented from intermingling, an overflow discharge pipe extending upward from the lower part of the soil water receptacle and having a discharge outlet at a point higher than the level of the water in the clean water receptacle, and a water seal trap between the overflow pipe and the discharge outlet.

In testimony whereof I affix my signature.
FRED S. BOLTZ.